United States Patent Office 3,573,217
Patented Mar. 30, 1971

---

3,573,217
METHOD OF PREPARING A STABLE MIXED SOL OF HEXAVALENT URANIUM AND TETRAVALENT THORIUM BY PEPTIZATION
Theo van der Plas, Vondellaan 41, Arnhem, Netherlands; Johannes B. W. Kanij, Da Costastraat 16, Zevenaar, Netherlands; Arend J. Noothout, Woudstralaan 1, Oosterbeek, Netherlands; and Marie E. A. Hermans, Diependalstraat 4, Arnhem, Netherlands
No Drawing. Continuation-in-part of application Ser. No. 635,379, May 2, 1967. This application June 30, 1969, Ser. No. 837,884
Int. Cl. C09k 3/00
U.S. Cl. 252—301.1       5 Claims

ABSTRACT OF THE DISCLOSURE

Method of preparing a stable mixed sol of hexavalent uranium and tetravalent thorium, and the gels, oxides and carbide that can be prepared from this mixed sol.

A method of preparing a stable mixed sol containing hexavalent uranium oxide and tetravalent thorium oxide, without resorting to the expensive process of reduction with hydrogen or other reducing agents in the liquid phase by peptizing a hydroxide precipitate.

---

The present application is a continuation-in-part of our application Ser. No. 635,379, filed May 2, 1967, now abandoned.

The invention relates to a method of preparing a mixed sol containing hexavalent uranium oxide and tetravalent thorium oxide, by first precipitating a hydroxide and then peptizing it.

Sols containing uranium and thorium are ideally adapted for the preparation of fissile particles for use in nuclear reactors.

It was, for instance, a known process to prepare fissile substances consisting of a mixed thorium-uranium oxide with a $UO_2$ content up to 50 percent by weight.

In order to prepare this mixed oxide a colloidal solution was first prepared by peptizing thorium hydroxide with uranyl nitrate, and after the reduction of this solution by means of hydrogen under pressure a granular oxide was prepared according to ordinary known methods.

It had not so far been possible, without reducing to tetravalent uranium a solution containing hexavalent uranium, to prepare a sol having a higher uranium-to-thorium ratio than 1:4.

The reduction of the hexavalent uranium is an expensive process, as it generally involves the use of rare metal catalyst and hydrogen gas under pressure. Moreover, there is always the possibility of introducing undesired inorganic substances.

It is desirable that the design of a reactor should not be restricted by the fact that the choice of the uranium-to-thorium ratio in the fissile material is likewise restricted.

Also it is known from Fitch et al., U.S. Pat. No. 3,330,-772, Example III, columns 7 and 8, to prepare a mixed sol of hexavalent uranium and tetravalent thorium oxide of generally unacceptable quality.

According to Fitch et al., first a mixed hydroxide coprecipitate was prepared by means of the addition of excess of ammonia to a mixed solution of uranyl nitrate and thorium nitrate, which was subsequently filtered and washed until free of electrolytes. The obtained precipitate which only contained about 12 percent of uranium oxide, was treated with an amount of nitric acid corresponding with 22 percent of the amount of heavy metal in an attempt to effect peptization. However, the peptization was no complete, since an easy separation of constituents could be effected by centrifugation. Hence it was not possible formerly to prepare a mixed sol of thorium and uranium oxide according to the co-precipitation method, even with a low uranium content.

The invention aims at preparing a stable mixed sol of good quality with a high U/Th ratio up to 50%.

The invention aims at preparing a stable mixed sol with a high U/Th ratio without resorting to reduction with hydrogen or other reducing agents in the liquid phase.

According to the invention, first an X-ray amorphous mixed precipitate of hexavalent uranium and tetravalent thorium is prepared by very quickly precipitating the hydroxide from a mixed soluton of uranium and thorium salts with excess of a solution of a base under strong stirring.

It appeared experimentally that the X-ray amorphous precipitates, which can be peptized to a "sol," could be prepared with U/Th ratios up to 1.

According to Fitch et al. only a sol with a much lower uranium content was prepared.

The obtained precipitate is washed with a dilute solution of a base and subsequently peptized, in one step, by boiling with a solution of a peptizing agent.

Suitable peptizing agents are, for instance solutions of hydrochloric or nitric acid, uranyl nitrate or chloride, thorium nitrate or chloride or mixtures of these substances.

It appeared that for peptizing in one step a minimum amount of chloride and/or nitrate is required. This minimum amount of nitrate and/or chloride is 25 mole percent of the total amount of heavy metal present.

Fitch et al. tried to peptize with about 22% of nitrate (21.9%).

Although Fitch et al. were very near to the profitable preparation of mixed sols, two important considerations were lacking which were as follows:

(a) For preparing mixed thorium and uranium sols (up to 50% of uranium) much care must be given to the preparation of an X-ray amorphous co-precipitate. This mixed co-precipitate contains practically no uranium diuranate, as shown by X-ray diffraction.

(b) For successfully peptizing the precipitate in one step a minimal critical amount of nitrate and or chloride corresponding with 25% of the heavy metal is required. Peptization in one step is important in case of technical applications.

A very suitable method to accomplish coprecipitation is addition of a mixed solution of thorium and uranyl salts to a solution of ammonia.

Precipitation is preferably effected with carbonate-free ammonia, while in addition precautions are taken against the instrusion of carbon dioxide from the atmosphere. In this way the uranium is prevented from remaining in solution (or passing into solution) as a carbonate complex.

The sols obtained according to the above-mentioned methods permit of conversion, according to known methods, into gels which can be desiccation and incandescence be converted into oxides.

A carbon-containing sol can be obtained by adding finely divided carbon to the said sols.

A sol containing finely divided carbon can be converted by drying an annealing into granular carbides.

Granular carbides permit of application as fissile materials.

A number of typical embodiments which further explain the invention are given below.

PREPARATION OF MIXED SOLS

Table I, further below, gives the summarized results of a series of six tests relating to the preparation of mixed sols by peptization with nitric acid; one of the tests, No. 3, is described in full.

A quantity of 15.4 ml. of 2.16 molar uranyl nitrate is mixed with 33.6 ml. of a 1.97 molar thorium nitrate solution, the mixed solution being subsequently diluted to 1 liter, after which the now dilute solution is added under stirring to 200 ml. of a carbonate-free ammonia solution containing 25 percent by weight of ammonia, as a result of which a precipitate is formed.

The precipitate formed is then washed with dilute ammonia solution, to the exclusion of carbon dioxide. The precipitate thus washed is subsequently peptized by being heated for 1 hour in 50 ml. 0.5 molar nitric acid. The mole percentage of nitrate with respect to heavy metal is, therefore 25%; the nitrate content of the washed precipitate being negligible as compared with the amount of nitric acid added for peptization. The sol obtained is concentrated to the utmost extent by evaporation, thereby bringing it to a concentration of 1.84 mol (thorium + uranium) per kg. of sol.

Concentrating to the utmost extent by evaporation means evaporating down to the appearance of a slight quantity of precipitate, after which this precipitate is re-peptized by the addition of a small quantity of water. The maximum concentration obtained in this way depends, inter alia, upon the ratio between uranium and thorium.

The sols thus obtained have concentrations ranging between 1 and 2.5 mol (Th+U) per kg. of sol.

The sol obtained is very stable; after more than 30 days, there is still no formation of precipitate from the liquid phase.

Tests 1 and 2 in Table I give fairly stable sols; after a few days a slight precipitate is formed from the liquid phase. This, however, is no obstacle to the preparation of granular gels and oxides of good quality from these sols.

Tests 3 to 6 give sols which are very stable; after more than 30 days there is no precipitation from the liquid phase.

The values given by the respective columns in Table I are as follows:

Column 1 = test number.
Column 2 = uranium-thorium ratio in the finally prepared sol.
Column 3 = ml. of 1.97 molar thorium nitrate solution mixed with the quantity of uranyl nitrate solution given by column 4.
Column 4 = ml. of 2.16 molar uranyl nitrate solution.
Column 5 = the maximum obtainable concentration of heavy metal (U+Th) in the concentrated sol, in mols per kg. of sol.
Column 6 = the stability of the sol; fairly stable means precipitation after a period longer than a few days; very stable means no precipitation after a period longer than 30 days.

TABLE I

| 1 | 2 | 3 | 4 | 5 | 6 |
|---|---|---|---|---|---|
| Test No. | U/Th | Ml. Th(NO$_3$)$_4$ | Ml. UO$_2$(NO$_3$)$_2$ | Max. conc. | Stability |
| 1 | 1:1 | 25.4 | 23.2 | 1.0 | Fairly stable. |
| 2 | 1:1.6 | 31.2 | 17.8 | 1.5 | Do. |
| 3 | 1:2 | 33.6 | 15.4 | 1.8 | Very stable. |
| 4 | 1:2.5 | 36.2 | 13.0 | 2.2 | Do. |
| 5 | 1:3.3 | 31.3 | 10.7 | 2.2 | Do. |
| 6 | 1:5 | 42.4 | 7.7 | 2.4 | Do. |

Table II, which follows below, gives the collected results relating to the preparation of sols which were obtained by peptization with a solution of uranyl nitrate or a solution of uranyl and thorium nitrate. In the latter case care was taken that the uranium-to-thorium ratio in the peptizing liquid was equal to the ratio in the precipitate.

In every case the following solution was taken as basis: thorium nitrate 1.84 mol/l., uranyl nitrate 1.29 mol/l.

The tests were carried out in the manner already described for the tests in Table I.

In Table II the respective columns 1, 2, 3 and 4 give the same data as in Table I, while columns 5 and 6 give the quantity of uranyl nitrate and thorium nitrate respectively which was used for peptizing, 7 the maximum concentration of sol obtained and 8 the stability.

TABLE II

| 1 | 2 | 3 | 4 | 5 | 6 | 7 | 8 |
|---|---|---|---|---|---|---|---|
| Test No. | U/Th | Ml. Th(NO$_3$)$_4$ | Ml. UO$_2$(NO$_3$)$_2$ | Ml. U | Ml. Th | Mol./kg. | Stability |
| 7 | 0.51 | 60 | 25 | 18.5 |  | 1.5 | Very stable. |
| 8 | 0.33 | 80 | 38 | 3.4 | 7.5 | 1.8 | Do. |
| 9 | 0.36 | 90.5 | 24.8 | 21.6 |  | 2.1 | Do. |
| 10 | 0.34 | 84.0 | 41.1 | 6.6 | 3.2 | 2.17 | Do. |
| 11 | 0.88 | 63.2 | 58.1 | 20.9 |  | 1.1 | Fairly stable. |
| 12 | 0.86 | 71.2 | 5.3 | 6.5 |  | 0.9 | Do. |

The peptizing by uranyl nitrate causes the U/Th ratio in the product to become greater than the ratio in the precipitate.

EXAMPLE REFERRING TO THE CRITICAL MINIMUM AMOUNT OF PEPTIZING NITRATE

A volume of 50 ml. 1.84 molar Th(NO$_3$)$_4$ solution, (92.0 mmol Th) was mixed with 9.3 ml. 1.75 molar UO$_2$(NO$_3$)$_2$ solution, (16.3 mmol U), the resulting solution was diluted to a heavy metal concentration of about 1 molar. The mixed solution is subsequently added under strong stirring to an equal volume of ammonia solution of 25 percent by weight. The resulting precipitate is filtered off and washed with 1 liter of ammonia solution (concentration 10%). After the washing out with ammonia the precipitate is washed with distilled water until free of ammonia.

Finally the precipitate was peptized with water and 1.9 cc. of strong nitric acid, concentration 14.4 molar. The calculated amount of nitric acid was $$\frac{1.9 \cdot 14.4}{92.0 + 16.3} \times 100 = 25.3\%$$

An analysis of the content of nitrate, thorium and uranium in the resulting sol gave a nitrate content of 25.5%.

The ratio of U to Th in the sol is 12.7 mole percent.

This example shows that a slight increase in the amount of nitric acid, used by Fitch et al., will result in a useful sol, provided that the precipitate used by Fitch et al., conformed to the requirements listed above (X-ray amorphous).

PREPARATION OF GELS

Globular gel particles can be prepared from the sols described in the foregoing.

Examples 5 ml. of 2 mol hexamethylene-tetramine and 5 ml. of 6.7 mol urea are added to 100 g. of the sol while stirring intensively. The mixed sol is dispersed in an organic liquid, for example the commercial mixture of higher alcohols known as "Alphanol 79," using an emulsifying agent (Span 80). The organic phase is kept at a temperature of 40°–60° C. The gel particles obtained are washed with carbon tetrachloride to remove the organic liquid and afterwards with an aqueous solution of 1 mol/l. ammonia and 1 mol/l. ammonium formate. The product obtained is dried at 130° C. and converted into well-sintered oxidic material at temperatures of 1100° C. or higher. This last stage may be effected in air or hydrogen or in an inert gas.

According to another, likewise serviceable method of gelling the sol is dispersed without any addition in an organic liquid containing an emulsifying agent, which liquid is kept at a temperature between 90° C. and 110° C. The product obtained in this way is washed with benzene and afterwards subjected to the above mentioned treatments at 130° and 1110° C. The size of the oxide particles was approximately 300–400 microns.

PREPARATION OF CARBIDES

For the preparation of mixed carbides of uranium and thorium with an uranium-to-thorium ratio between 1:6 and 1:1, the desired quantity of carbon in a finely divided form is added to the sols prepared in the manner described above. Intensive mixing is necessary. Gelling, heating to form carbide and sintering of the carbide can be effected according to known methods.

Example 13.4 g. of carbon is added to 100 g. of a sol containing per kg. 1.13 mol of thorium and 0.45 mol of uranium. The sol is gelled in the manner described under gelling. The gel particles obtained can be dried and thermally treated.

We claim:

1. In a method of preparing a mixed sol containing hexavalent uranium oxide and tetravalent thorium oxide, said method comprising: precipitating very quickly a hydroxide coprecipitate of the mixed hydroxides of hexavalent uranium and tetravalent thorium with a very low content of ammonium diuranate from a mixed solution of thorium salts and uranyl salts with excess of a base; separating the coprecipitate, washing the separated precipitate with an aqueous solution of the base; and peptizing the precipitate by heating with an aqueous solution of a peptizing agent selected from the group consisting of nitric acid, hydrochloric acid, uranyl nitrate, uranyl chloride, thorium chloride, thorium nitrate and mixtures thereof, the improvement wherein said precipitate is peptized in one step, and the resulting molar ratio of nitrate or mixtures thereof or chloride to total metal present being at least 0.25.

2. A process as in claim 1 wherein the mixed aqueous solution is added quickly under strong stirring to excess of a solution of ammonia of about 25 weight percent and the coprecipitate is subsequently washed with dilute ammonia of about 10 weight percent and water.

3. A process as in claim 2 wherein said ammonia solutions are carbonate-free and wherein the precipitating separating and washing steps are performed in a carbon dioxide-free atmosphere.

4. A method of preparing a mixed sol containing hexavalent uranium oxide and tetravalent thorium oxide in which the uranium to thorium ratio is between about 1:4 and 1:1 and containing between about 1 and about 2.5 mols total uranium plus thorium per kilogram of sol, said method comprising: forming an aqueous solution containing a soluble hexavalent uranium salt and a soluble tetravalent thorium salt; coprecipitating a mixed hydroxide of hexavalent uranium and tetravalent thorium in which the uranium to thorium ratio is greater than 1 to 4 by adding the mixed salt solution under stirring to an excess of an aqueous solution of ammonia to thereby avoid post precipitation; washing the mixed hydroxide precipitate; and peptizing the mixed hydroxide precipitate by heating with an aqueous solution of a peptizing agent selected from the group consisting of nitric acid, hydrochloric acid, uranyl nitrate, uranyl chloride, thorium chloride and thorium nitrate and mixtures thereof to thereby produce said sol free from any solid residue.

5. A method as in claim 4, wherein the sol, after peptization, is concentrated by evaporation to the extent that a slight quantity of a precipitate is formed after which the precipitate is repeptized by addition of a small amount of water.

References Cited

UNITED STATES PATENTS

| | | | |
|---|---|---|---|
| 1,775,640 | 9/1930 | Griessbach et al. | 252—301.1 |
| 3,091,592 | 5/1963 | Fitch et al. | 252—301.1 |
| 3,171,815 | 3/1965 | Kelley et al. | 252—301.1 |
| 3,189,555 | 6/1965 | Smith et al. | 252—301.1 |
| 3,325,419 | 6/1967 | Harley et al. | 252—301.1 |
| 3,326,812 | 6/1967 | Smith et al. | 252—301.1 |
| 3,326,813 | 6/1967 | Fitch et al. | 252—301.1 |
| 3,287,279 | 11/1966 | Lyon | 252—301.1 |
| 3,329,623 | 7/1967 | Fitch et al. | 252—301.1 |
| 3,330,772 | 7/1967 | Fitch et al. | 252—301.1 |
| 3,331,783 | 7/1967 | Braun | 252—301.1 |

CARL D. QUARFORTH, Primary Examiner

F. M. GITTES, Assistant Examiner

U.S. Cl. X.R.

264—0.5